June 16, 1959 L. HALPERT 2,891,235
COMBINATION VEHICULAR WARNING EXTENSION LIGHT
Filed April 2, 1958
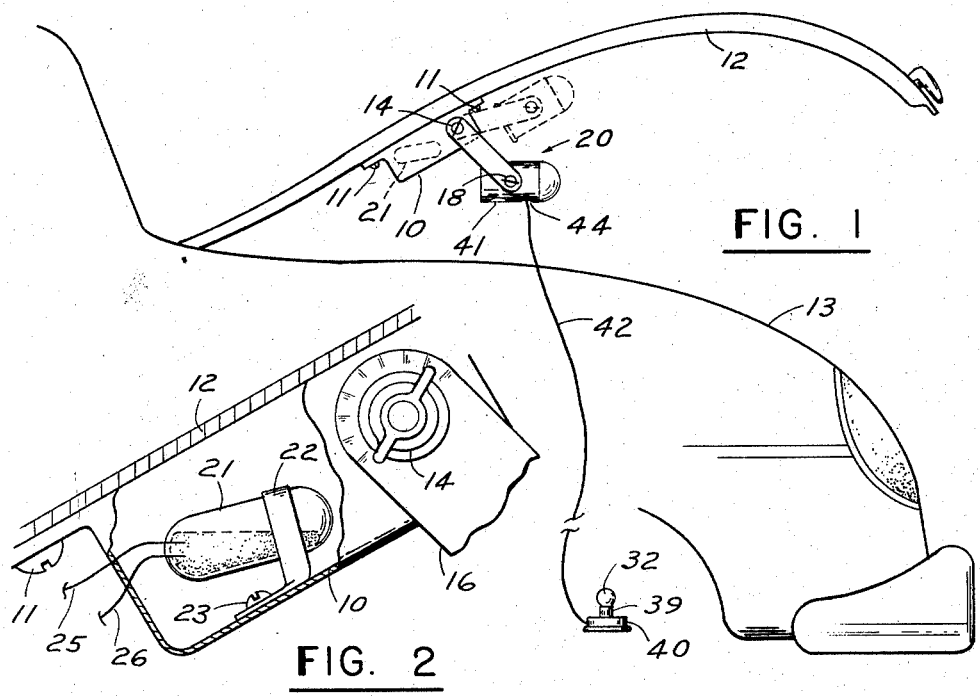
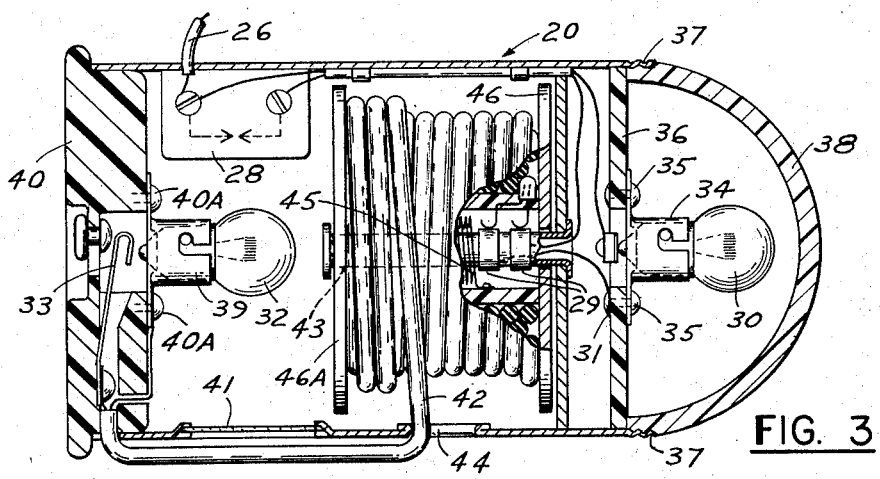
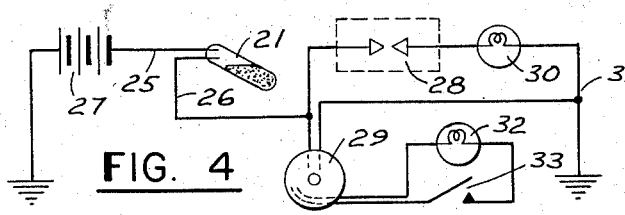
INVENTOR.
LOUIS HALPERT
BY George Spector
AGENT

United States Patent Office 2,891,235
Patented June 16, 1959

2,891,235

COMBINATION VEHICULAR WARNING EXTENSION LIGHT

Louis Halpert, Brooklyn, N.Y.

Application April 2, 1958, Serial No. 725,928

2 Claims. (Cl. 340—87)

This invention relates to a combination flashing electric signal extension and trunk light whose primary purpose is to warn approaching motorists of a stalled or stopped vehicle.

In the event an automobile because of mechanical, tire or other trouble breaks down on the road, day or night, especially at night, to prevent accidents the operator will require some sort of warning device at the rear of his vehicle to warn approaching motorists. The flashing signal light, which is the subject of this invention, has many advantages when compared to the conventional flare. For example the flashing signal light provided by this invention that is instantly put into operation by simply lifting the trunk compartment cover thus eliminating the time required for lighting conventional flares. Another advantage is that a flashing light is more readily seen than a steady burning light.

In addition the invention provides the motorist with an extension light for use about the vehicle's exterior and a trunk light for illuminating the trunk compartment all contained in a compact unit easily installed on the inner surface of the trunk door.

It is therefore an object of this invention to provide an intermittent electric signal light that is activated by the opening of the trunk compartment cover.

Another object is to provide a flashing signal light that is attached to the inner surface of the trunk compartment cover and actuated by opening the trunk.

Another object is to provide illumination for the trunk compartment actuated by the opening of the door.

Still another object is to provide an extension light for the motorist when he is performing repairs which is actuated by the opening of the trunk.

Other objects and advantages will become apparent from the following detailed description, claims and drawings in which:

Figure 1 is a side elevation of the rear of a car with the trunk compartment door open showing the novel combined signal and extension light.

Figure 2 is a partial section showing details of the mercury switch and other related details of the invention.

Figure 3 is a cross-sectional detailed view of the flashing signal and extension light assembly.

Figure 4 is a schematic drawing of the electrical system which operates the invention.

Referring to Figure 1 a hollow-housing 10 is shown which is mounted by means of screws 11 to the inner surface of the trunk door 12 of the automobile 13. Attached to said hollow housing 12 by means of wing nuts 14, 15 (15 not shown) are two adjustable link arms 16, 17 (17 not shown). Said adjustable link arms 16, 17 are by means of wing nuts 18, 19 (19 not shown) attached to the flashing signal, extension and trunk light assembly 20.

Referring to Figure 2 there is a detailed drawing of the hollow housing 10 in which can be seen the conventional mercury switch 21 as it is mounted in said hollow housing 10 by means of a metal clip 22 and screws 23.

The attached adjustable link arms 16, 17, are adjusted to a desired position by loosening nuts 14, 15, 18 and 19. However, if wing nuts 14, 15 are left loose, the signal assembly will assume the position in Figure 1, when the trunk door 12 of the automobile 13 is opened; at the same time the mercury flows to a position whereby it completes the circuit from wire 25 to 26. Since wire 25 is attached to a source of current and wire 26 eventually leads to ground, the circuit is completed.

Referring now to Figure 4 there is a detailed schematic drawing of the wiring system which operates the invention. Said wire 26 is in series with a conventional flasher unit 28 and also in series with a pair of slip rings 29. The flasher unit 28 is in parallel with the slip rings 29. The flasher unit 28 is in turn connected in series with the flashing electric signal light 30 and from said light 30 to ground 31. The slip rings 29 are in turn connected in series with the extension light 32 which is connected in series with an off-on switch 33. To complete the circuit a wire is connected from the said off-on switch 33 back to the slip rings 29 and then to ground 31.

Referring now to Figure 3 there is detailed drawing of the flashing signal extension and trunk light assembly 20. The flashing electric signal light 30 is screwed into an internally threaded circular lamp base 34 which is mounted by means of screws 35 to a flat disk 36. Protruding above the flat disk 36 is an internally threaded circular flange 37 into which is screwed a colored transparent dome 38. The extension light 32 is screwed into an internally threaded circular lamp base 39 which is mounted by means of screws 40 to a flat circular casting 40. The flat circular casting 40 has a circular cavity in its center which provides access to the off-on switch 33. The lower portion of the flat circular casting 40 is flanged while its upper portion is of a diameter which will allow it to be snap fitted into place. When said casting 40 is snapped into place and the trunk door 12 is opened, the light from the extension lamp 32 shines through the window 41 to illuminate the trunk compartment. If the operator of the vehicle wishes to use the extension light 32 as an extension lamp all that is required for him to do is snap the flat circular casting 40 from its normal position and pull out the extension cord 42. The extension cord 42 unwinds from its reel 43 and is pulled out through a specially provided hole 44. A spring 45 biases the reel 43 to the wound position and conventional latching device (not shown) may be provided to hold the extension cord 42 in place when it is in its extended position. Spaced end flanges 46 and 46A confine the wire coils on the reel. Instead of a spring biased reel the extension cord 42 may be coiled about lamp base 39 or neatly inserted within the signal assembly housing.

The flashing signal light is activated when the automobile's trunk door is opened. Opening the trunk causes the flashing signal and extension light asesmbly to fall into the correct position when nuts 14 and 15 are loose. Opening the trunk also causes the mercury switch to complete the electrical connection from the automobile battery to the flashing signal light and the extension light. With the circuit completed the signal light flashes its warning to approaching motorist and the trunk is immediately illuminated. When the invention is not used it is stored compactly against the inner surface of the trunk door where it is out of the way but always available for use. One may prefer to tighten the wing nuts 14 and 15 with the assembly 20 against the trunk door surface when the trunk is closed. Thus when the door 12 is opened and it is desired to use the flashing signal, the operator must loosen wing nuts 14 and 15 and move the assembly 20 to the desired position. By virtue of the links and wing nut combination the signal assembly can be set with its axis directed in a manner to cast the warning signal a maximum distance to the rear of the vehicle thereby providing ample warning for approaching motorists.

While, in disclosing the principles, of the invention and its preferred embodiment, various detailed structures and relationships have been disclosed; it will be understood that such embodiments and details are given by way of example only and not as limiting the scope of the invention. Other modifications can and may be employed within the scope of this invention.

Having thus described the invention, what is claimed is:

1. A warning light for motorists in combination with a trunk door of an automobile comprising a housing containing an electric light connected to wire conductors, including means for adjustably mounting the housing pivotally on the trunk door and a switch in series with said light by means of said conductors, said switch being responsive to an opening movement of the trunk door to complete the circuit to operate the light and responsive to a closing of the trunk door to extinguish the said light in combination with a second light removably mounted in the housing, said second light being in series with the switch and parallel with the first said light, whereby opening of the trunk door operates both lights simultaneously, said second light including an extension cord, including means mounted in the housing for retaining the extension cord in a coiled position.

2. The device as in claim 2 wherein the last said means comprises spring biased reel mounted in the housing wherein a spring torsionally biases the coiled extension cord to a fully coiled position about said reel, said reel including means for maintaining electrical continuity with the circuiting of the device during winding or unwinding of the coiled extension cord about the reel.

References Cited in the file of this patent

UNITED STATES PATENTS

| | | |
|---|---|---|
| 1,901,411 | Rich | Mar. 14, 1933 |
| 2,054,919 | Anibal | Sept. 22, 1936 |
| 2,221,178 | Best | Nov. 12, 1940 |
| 2,238,728 | Hadley | Apr. 15, 1941 |
| 2,511,893 | Alden | June 20, 1950 |
| 2,772,406 | Juergens | Nov. 27, 1956 |